G. Dock.
Car-Wheel
№ 74999  Patented Mar. 3, 1868.

Witnesses-  
W. C. Ashkettle  
Theo Tusche

Inventor-  
G. Dock.  
per Munn & Co  
attorneys

United States Patent Office.

GILLIARD DOCK, OF WICONISCO, PENNSYLVANIA.

*Letters Patent No. 74,999, dated March 3, 1868.*

IMPROVED CAR-WHEEL.

*The Schedule referred to in these Letters Patent and making part of the same.*

TO ALL WHOM IT MAY CONCERN:

Be it known that I, GILLIARD DOCK, of Wiconisco, in the county of Dauphin, and State of Pennsylvania, have made and invented a new and useful Improvement in Railroad-Car Wheels; and I do hereby declare that the following is a full, clear, and exact description thereof, which will enable those skilled in the art to make and use the same, reference being had to the accompanying drawings, forming part of this specification, in which—

Figure 1:
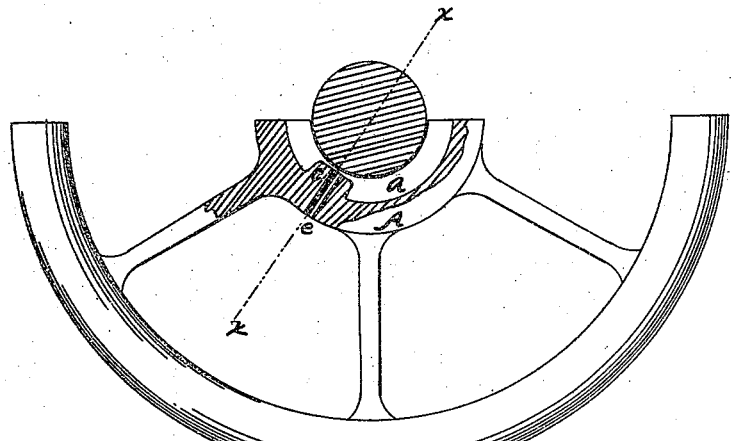
Figure 2:
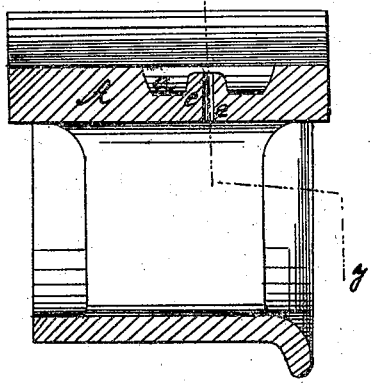

Figure 1 represents a side view of a segment of a car-wheel partly broken out at the hub to show my improved device for preventing the loss and waste of oil, and Figure 2 an enlarged sectional partial view of the same cut through the line $x\ x$, fig. 1.

Similar letters of reference indicate corresponding parts.

This invention relates to an improvement in railroad-car or truck-wheels, for mining purposes, and consists in a device in the hub of the wheel for the purpose of preventing the loss of oil from a recess which holds the oil, in order to keep the axle constantly lubricated, whereby the wear and draught of the friction are greatly diminished, and the waste of oil is prevented, that is common, especially with trucks or drift-cars for mining purposes.

On the inside of the hub A of the car-wheel is an annular recess, $a$, in the bottom of which is a small projection, $c$, that rises nearly to the inner surface, but terminating so that it shall not at any time come in contact with the axle. A hole, $e$, is made through the projection $c$ for a feed-hole through which to pour the oil into the recess $a$, when the wheel is turned in the proper position. It will be seen that by means of this arrangement the oil put in the recess $a$ cannot come out, and will remain to constantly lubricate the axle.

Having thus described my invention, I claim as new, and desire to secure by Letters Patent—

The perforated projection $c$, in combination with the recess $a$ in the hub A of a car-wheel, constructed and operating substantially as and for the purpose herein described.

The above specification of my invention signed by me, this 5th day of December, 1867.

GILLIARD DOCK.

Witnesses:
  J. A. HARPER,
  J. RICHARDSON,